United States Patent
Oda et al.

(10) Patent No.: US 8,409,767 B2
(45) Date of Patent: Apr. 2, 2013

(54) FUEL CELL

(75) Inventors: Masaru Oda, Wako (JP); Yasuhiro Watanabe, Wako (JP); Hidetada Kojima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 12/953,486

(22) Filed: Nov. 24, 2010

(65) Prior Publication Data

US 2011/0123898 A1 May 26, 2011

(30) Foreign Application Priority Data

Nov. 26, 2009 (JP) ................................. 2009-268490

(51) Int. Cl.
*H01M 8/04* (2006.01)
(52) U.S. Cl. ....................................................... 429/514
(58) Field of Classification Search .................... 429/514
See application file for complete search history.

(56) References Cited

U.S. PATENT DOCUMENTS

| | | | | |
|---|---|---|---|---|
| 2002/0064702 A1* | 5/2002 | Gibb | .............................. | 429/34 |
| 2003/0077501 A1* | 4/2003 | Knights et al. | .................. | 429/38 |
| 2007/0003816 A1* | 1/2007 | Sugita et al. | .................... | 429/39 |
| 2007/0105001 A1 | 5/2007 | Ohma | | |
| 2008/0199738 A1* | 8/2008 | Perry et al. | ...................... | 429/12 |
| 2009/0186253 A1* | 7/2009 | Trabold et al. | .................. | 429/34 |

FOREIGN PATENT DOCUMENTS

| | | |
|---|---|---|
| CN | 100546082 C | 9/2009 |
| JP | 6-267559 | 9/1994 |
| JP | 2005-203288 | 7/2005 |

OTHER PUBLICATIONS

Chinese Office Action for corresponding CN Application No. 201010531576.2, Dec. 28, 2012.

* cited by examiner

*Primary Examiner* — Patrick Ryan
*Assistant Examiner* — Muhammad Siddiquee
(74) *Attorney, Agent, or Firm* — Ditthavong Mori & Steiner, P.C.

(57) ABSTRACT

A fuel cell includes a membrane electrode assembly and separators which are stacked. A fuel gas channel allows a fuel gas to flow along a surface of one of a pair of electrodes. An oxidant gas channel allows an oxidant gas to flow along a surface of another of a pair of electrodes. A channel width of the oxidant gas channel in a central portion of the oxidant gas channel in a channel width direction is larger than a channel width of the oxidant gas channel in both end portions of the oxidant gas channel in the channel width direction. A channel width of the fuel gas channel in a central portion of the fuel gas channel in a channel width direction is smaller than a channel width of the fuel gas channel in both end portions of the fuel gas channel in the channel width direction.

8 Claims, 10 Drawing Sheets

BACKGROUND ART

FUEL CELL

CROSS-REFERENCE TO RELATED APPLICATIONS

The present application claims priority under 35 U.S.C. §119 to Japanese Patent Application No. 2009-268490, filed in the Japan Patent Office on Nov. 26, 2009, entitled "Fuel Cell", the entire contents of which are incorporated herein by reference.

BACKGROUND OF THE INVENTION

1. Field of the Invention

The present invention relates to a fuel cell.

2. Description of the Related Art

A solid polymer electrolyte fuel cell includes unit cells. Each of the unit cells includes a membrane electrode assembly (MEA) and a pair of separators sandwiching the MEA therebetween. The MEA includes an electrolyte membrane, which is a polymer ion-exchange membrane, and an anode electrode and a cathode electrode sandwiching the electrolyte membrane therebetween. The solid polymer electrolyte fuel cell, which usually includes a certain number of the unit cells that are stacked, is used as a fuel cell stack for an automobile.

In the above fuel cell, a fuel gas channel for supplying a fuel gas to the anode electrode is formed on a surface of one of the separators, and an oxidant gas channel for supplying an oxidant gas to the cathode electrode is formed on a surface of the other of the separators. Moreover, a coolant channel, through which coolant flows, extends along surfaces of the separators of the unit cells that are adjacent to each other.

Some fuel cells have an internal manifold structure. The internal manifold structure is built up of a fuel gas inlet manifold, a fuel gas outlet manifold, an oxidant gas inlet manifold, an oxidant gas outlet manifold, a coolant inlet manifold, and a coolant outlet manifold. These manifolds are disposed in the fuel cell and extend through the fuel cell in the stacking direction of the separators.

Such an internal manifold fuel cell has a problem in that it is difficult to uniformly supply a fuel gas and a oxidant gas (reactant gas) to a power generation section (power generation surfaces of electrodes) and thereby the power generation performance may lowered. For example, a fuel cell described in Japanese Unexamined Patent Application Publication No. 6-267559 addresses this problem.

This fuel cell includes a separator 1 illustrated in FIG. 10. Gas is supplied to the separator 1, and the gas flows through a gas inlet 2, a power generation section inlet 3, a power generation section, a power generation section outlet 4, and a gas outlet 5. A gas channel 6 extends from the gas inlet 2 to the power generation section inlet 3. Trapezoidal fin groups 7a, 7b, and 7c are disposed in the gas channel 6.

Each of the trapezoidal fin groups 7a, 7b, and 7c includes a large number of trapezoidal fins that are arranged in a staggered manner, and the trapezoidal fins are selectively oriented. That publication states that the pressure of the gas is substantially equalized in the power generation section inlet 3 due to the trapezoidal fins, and thereby the flow rate of gas in the power generation section inlet 3 is substantially uniform.

However, the fuel cell described in Japanese Unexamined Patent Application Publication No. 6-267559 has the following problems. First, the structure is complex and is not cost efficient, because the gas channel 6 includes the trapezoidal fin groups 7a, 7b, and 7c, each including a large number of trapezoidal fins that are arranged in a staggered manner and are selectively oriented. Second, a pressure drop of the gas is large, because the gas flows through the trapezoidal fin groups 7a, 7b, and 7c before being supplied to the power generation section through the power generation section inlet 3.

Third, a stack of the fuel cells becomes large, because, in order to uniformly distribute the gas, it is necessary that the gas channel 6 have a large size and thereby the proportion of the area of an electrode to the area of the separator (area utilization) is decreased.

SUMMARY OF THE INVENTION

According to another aspect of the present invention, a fuel cell includes a membrane electrode assembly and separators. The membrane electrode assembly and the separators are stacked. The membrane electrode assembly includes an electrolyte membrane and a pair of electrodes sandwiching the electrolyte membrane therebetween. A fuel gas channel and an oxidant gas channel extend a longitudinal direction of the separators. The fuel gas channel allows a fuel gas to linearly flow along a surface of one of the pair of electrodes. The oxidant gas channel allows an oxidant gas to linearly flow along a surface of another of the pair of electrodes. A fuel gas inlet manifold and a fuel gas outlet manifold extend in a stacking direction through respective ends of the separators in a longitudinal direction of the separators at diagonally opposite positions of the fuel gas channel. An oxidant gas inlet manifold and an oxidant gas outlet manifold extend in the stacking direction through respective ends of the separators in the longitudinal direction of the separators at diagonally opposite positions of the oxidant gas channel. A channel width of the oxidant gas channel in a central portion of the oxidant gas channel in a channel width direction is larger than a channel width of the oxidant gas channel in both end portions of the oxidant gas channel in the channel width direction. A channel pitch of the fuel gas channel in a central portion of the fuel gas channel in a channel width direction is larger than a channel pitch of the fuel gas channel in both end portions of the fuel gas channel in the channel width direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
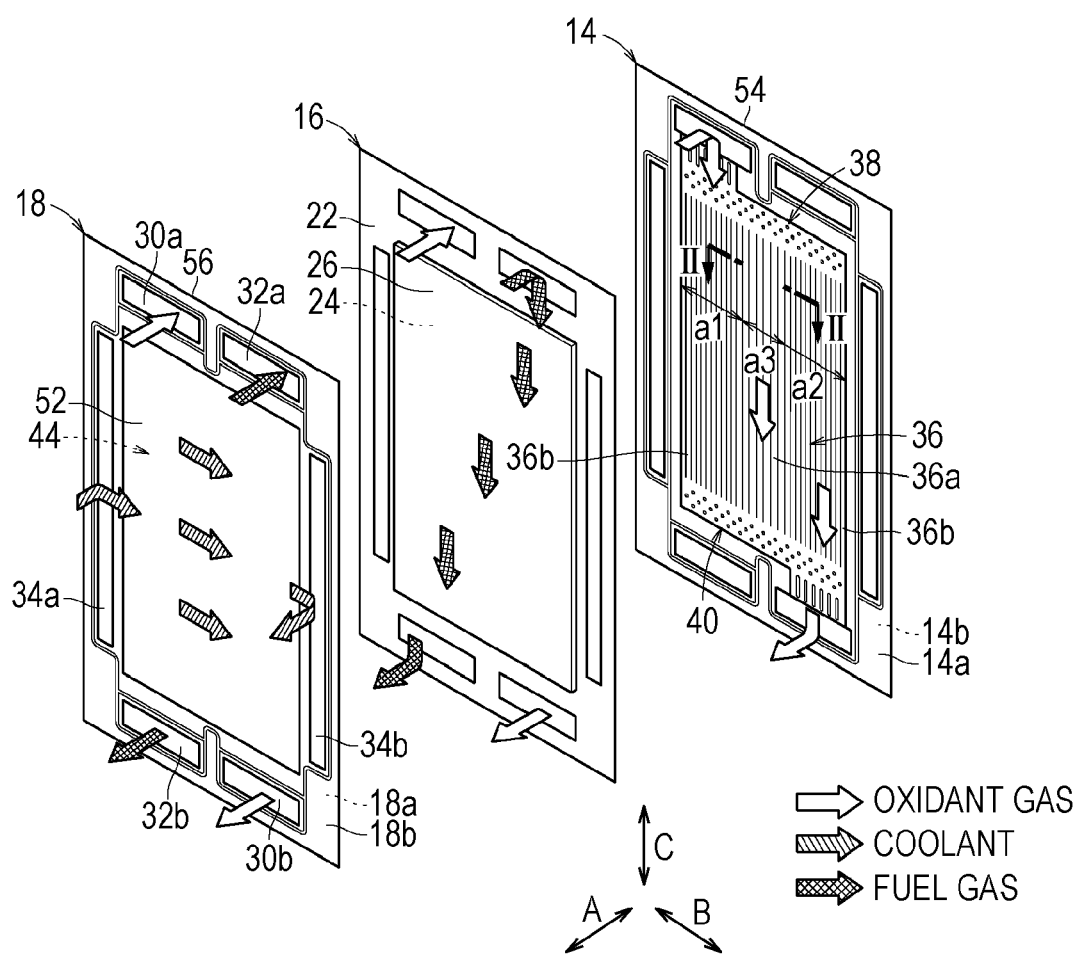
FIG. 1 is an exploded perspective view of a power generation unit of a fuel cell according to a first embodiment of the present invention.

The embodiments will now be described with reference to the accompanying drawings, wherein like reference numerals designate corresponding or identical elements throughout the various drawings.

FIG. 1 illustrates a power generation unit 12 of a fuel cell 10 according to a first embodiment of the present invention. The fuel cell 10 includes a plurality of the power generation units 12 that are stacked, for example, in the horizontal direction (direction of arrow A) to form a fuel cell stack. The fuel cell stack is used, for example, for automobiles. Alternatively, the power generation units 12 may be stacked in the direction of gravity (direction of arrow C).

Figure 2:
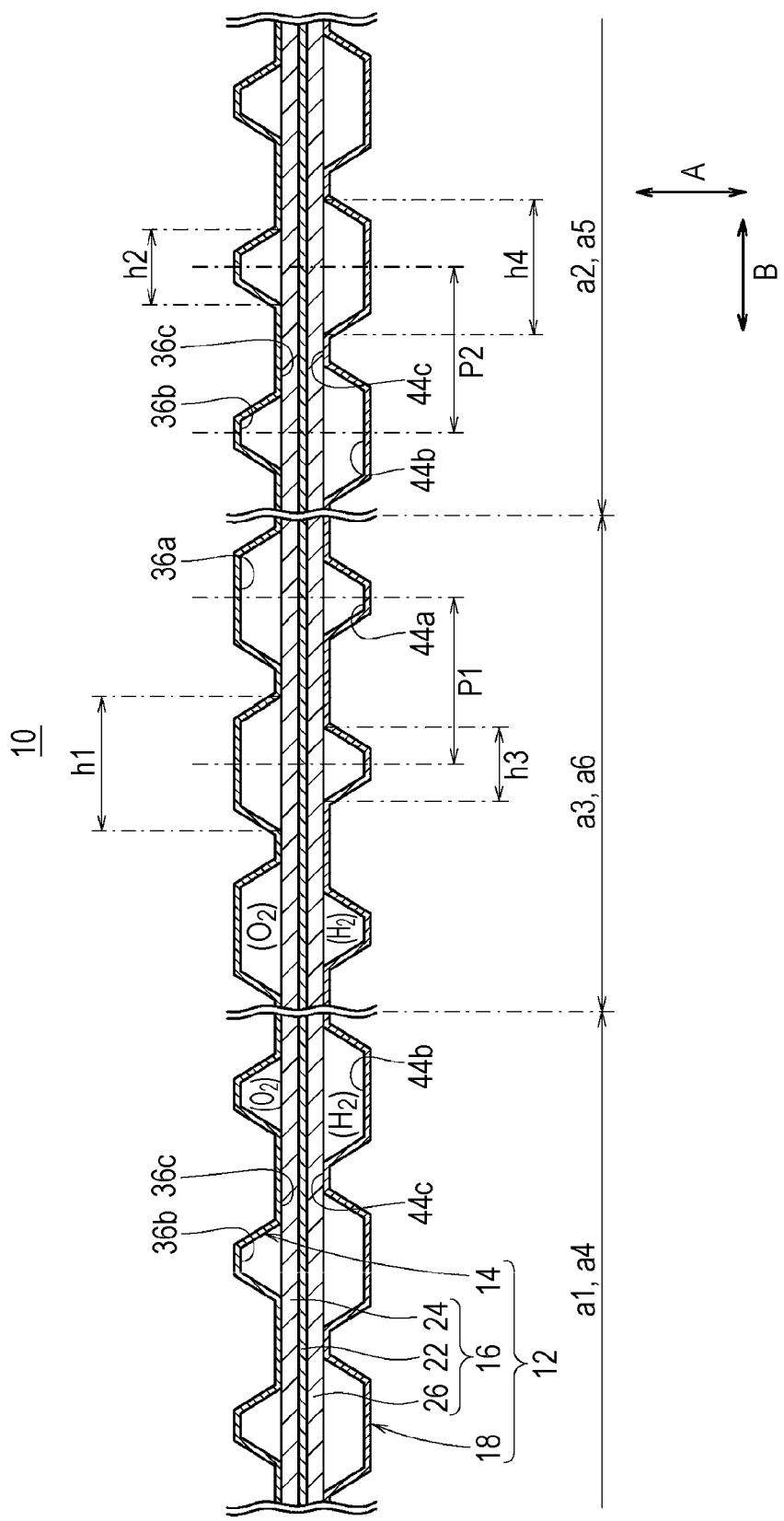
FIG. 2 is a sectional view of the fuel cell taken along line II-II of FIG. 1.

As illustrated in FIGS. 1 and 2, the power generation unit 12 includes a first separator (cathode separator) 14, a membrane electrode assembly (MEA) 16, and a second separator (anode separator) 18. The first and second separators 14 and 18 are each made of, for example, a rectangular metal plate such as a steel plate, a stainless steel plate, an aluminum plate, a galvanized steel plate, or any of such metal plates coated with an anti-corrosive coating.

The first and second separators 14 and 18 each have a rectangular shape in plan view and have protrusions and recesses in sectional view, which are formed by press-forming a thin metal plate in wave shapes. The first and second separators 14 and 18 may be, for example, carbon separators.

The membrane electrode assembly 16 includes a solid-polymer electrolyte membrane 22, and a cathode electrode 24 and an anode electrode 26 that sandwich the solid polymer electrolyte membrane 22 therebetween. The solid-polymer electrolyte membrane 22 is, for example, a thin film made of a perfluorosulfonate polymer that is impregnated with water.

The cathode electrode 24 and the anode electrode 26 each include a gas diffusion layer (not shown) and an electrode catalyst layer (not shown). The gas diffusion layer is made of carbon paper or the like. The electrode catalyst layer is made by uniformly coating a surface of the gas diffusion layer with porous carbon particles whose surfaces support a platinum alloy. The electrode catalyst layer is disposed on either side of the solid polymer electrolyte membrane 22.

As illustrated in FIG. 1, an oxidant gas inlet manifold 30a and a fuel gas inlet manifold 32a are disposed in an upper end portion of the power generation unit 12 in the longitudinal direction (direction of arrow C). The oxidant gas inlet manifold 30a and the fuel gas inlet manifold 32a extend through the power generation unit 12 in the direction of arrow A. An oxidant gas, such as an oxygen-containing gas, is supplied through the oxidant gas inlet manifold 30a. A fuel gas, such as a hydrogen-containing gas, is supplied through the fuel gas inlet manifold 32a.

A fuel gas outlet manifold 32b and an oxidant gas outlet manifold 30b are disposed in a lower end portion of the power generation unit 12 in the longitudinal direction (direction of arrow C). The fuel gas outlet manifold 32b and the oxidant gas outlet manifold 30b extend through the power generation unit 12 in the direction of arrow A. The fuel gas is discharged through the fuel gas outlet manifold 32b. The oxidant gas is discharged through the oxidant gas outlet manifold 30b. The oxidant gas inlet manifold 30a and the oxidant gas outlet manifold 30b are disposed at diagonally opposite positions in the power generation unit 12. The fuel gas inlet manifold 32a and the fuel gas outlet manifold 32b are disposed at other diagonally opposite positions in the power generation unit 12.

A coolant inlet manifold 34a is disposed in one end portion of the power generation unit 12 in the lateral direction (direction of arrow B) so as to extend through the power generation unit 12 in the direction of arrow A. A coolant is supplied through the coolant inlet manifold 34a. A coolant outlet manifold 34b is disposed in the other end portion of the power generation unit 12 in the lateral direction so as to extend through the power generation unit 12 in the direction of arrow A. The coolant is discharged through the coolant outlet manifold 34b.

Figure 3:
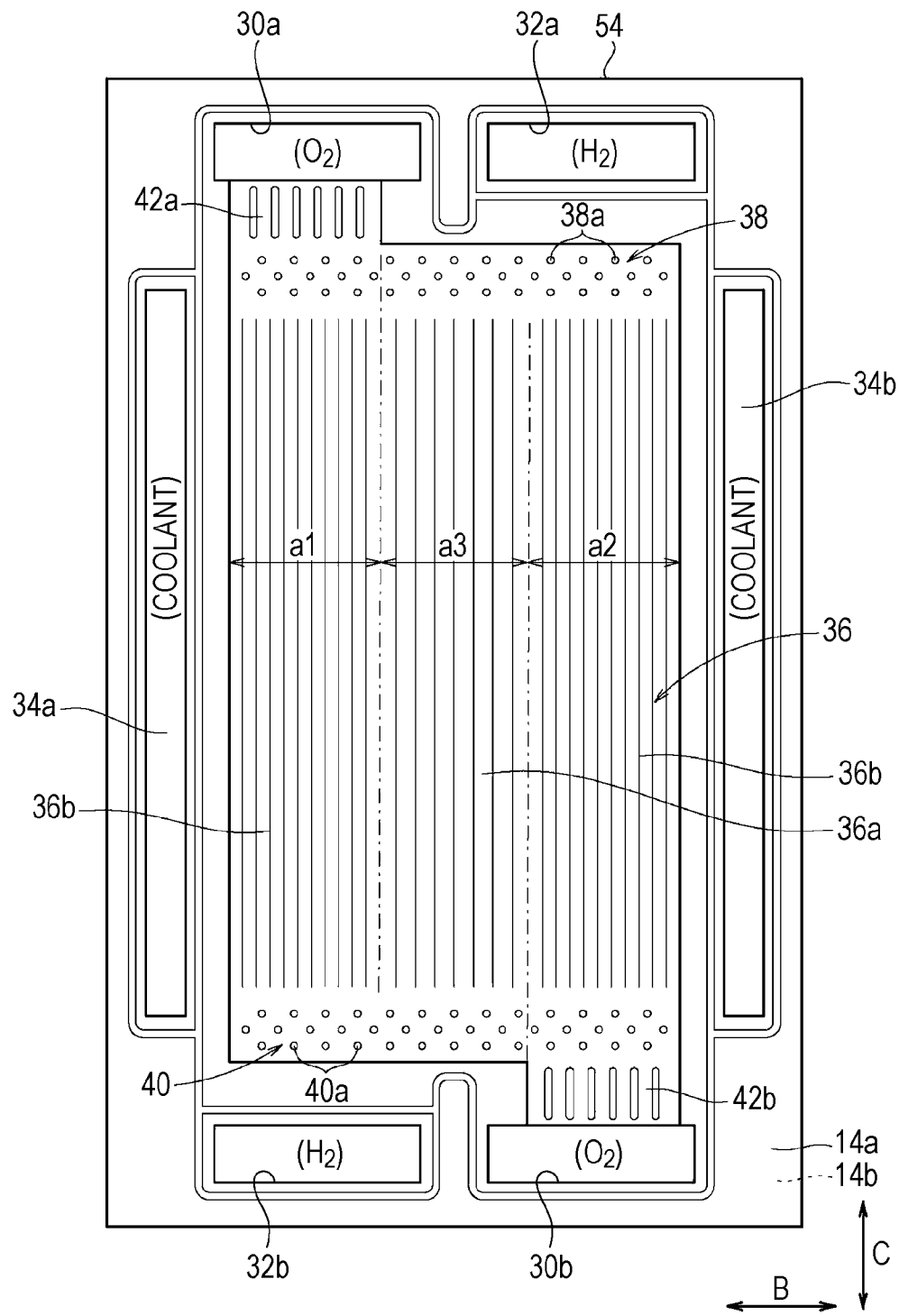
FIG. 3 is a plan view of a first separator of the power generation unit.

As illustrated in FIGS. 1 and 3, an oxidant gas channel 36 is formed on a surface 14a of the first separator 14 that faces the membrane electrode assembly 16. The oxidant gas channel 36 connects the oxidant gas inlet manifold 30a to the oxidant gas outlet manifold 30b. An inlet buffer 38 and an outlet buffer 40, respectively having a plurality of embossed protrusions 38a and 40a, are disposed near the inlet and the outlet of the oxidant gas channel 36. The oxidant gas inlet manifold 30a is connected to the inlet buffer 38 through an oxidant gas inlet portion 42a. The oxidant gas outlet manifold 30b is connected to the outlet buffer 40 through an oxidant gas outlet portion 42b.

As illustrated in FIGS. 2 and 3, the oxidant gas channel 36 has first channel grooves 36a and second channel grooves 36b, which extend in the direction of arrow C. The first channel grooves 36a are disposed in a central portion of the oxidant gas channel 36 in the channel width direction (direction of arrow B). The second channel grooves 36b are disposed in end portions of the oxidant gas channel 36 that are on both sides of the first channel grooves 36a in the channel width direction.

As illustrated in FIG. 2, the channel width h1 of the first channel grooves 36a is larger than the channel width h2 of the second channel grooves 36b (h1>h2). The channel pitch P1 of the first channel grooves 36a is equal to the channel pitch P2 of the second channel grooves 36b (P1=P2). The first channel grooves 36a and the second channel grooves 36b are recesses formed on a flat surface 36c.

As illustrated in FIG. 3, the central portion of the oxidant gas channel 36 in the channel width direction is a region a3 that is disposed between a region a1 and a region a2. The region a1 corresponds to the width of the oxidant gas inlet portion 42a when viewed in the flow direction of the oxidant gas channel 36. The region a2 corresponds to the width of the oxidant gas outlet portion 42b when viewed in the flow direction of the oxidant gas channel 36.

Figure 4:
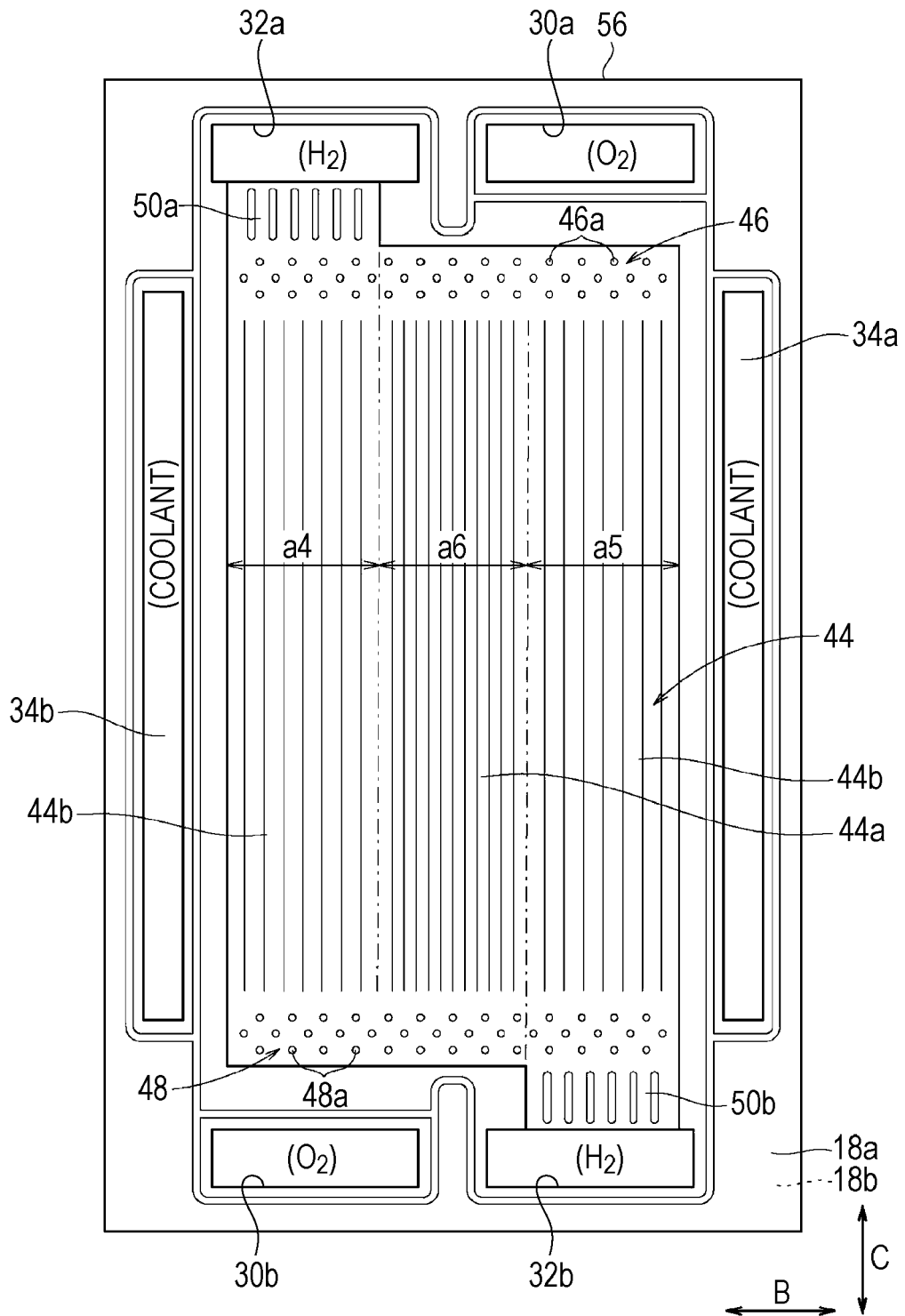
FIG. 4 is a plan view of a second separator of the power generation unit.

As illustrated in FIG. 4, a fuel gas channel 44 is formed on a surface 18a of the second separator 18 that faces the membrane electrode assembly 16. The fuel gas channel 44 connects the fuel gas inlet manifold 32a to the fuel gas outlet manifold 32b. An inlet buffer 46 and an outlet buffer 48, respectively having a plurality of embossed protrusions 46a and 48a, are disposed near the inlet and the outlet of the fuel gas channel 44.

The fuel gas inlet manifold 32a is connected to the inlet buffer 46 through a fuel gas inlet portion 50a. The fuel gas outlet manifold 32b is connected to the outlet buffer 48 through a fuel gas outlet portion 50b.

The fuel gas channel 44 has first channel grooves 44a and second channel grooves 44b, which extend in the direction of arrow C. The first channel grooves 44a are disposed in the central portion of the fuel gas channel 44 in the channel width direction (direction of arrow B). The second channel grooves 44b are disposed in end portions of the fuel gas channel 44 on both sides of the first channel grooves 44a in the channel width direction. It is preferable that the number of the second channel grooves 44b on either end portion in the channel width direction be the same. As illustrated in FIG. 2, the channel width h3 of the first channel grooves 44a is smaller than the channel width h4 of the second channel grooves 44b (h3<h4).

As illustrated in FIG. 4, the central portion of the fuel gas channel 44 in the channel width direction is a region a6 that is disposed between a region a4 and a region a5. The region a4 corresponds to the width of the fuel gas inlet portion 50a when viewed in the flow direction of the fuel gas channel 44. The region a5 corresponds to the width of the fuel gas outlet portion 50b when viewed in the flow direction of the fuel gas channel 44.

As illustrated in FIG. 2, in the central portion, the channel width h1 of the oxidant gas channel 36 and the channel width h3 of the fuel gas channel 44 have a relationship such that h1/h3>1. In both end portions, the channel width h2 of the oxidant gas channel 36 and the channel width h4 of the fuel gas channel 44 have a relationship such that h2/h4<1.

The first channel grooves 44a and the second channel grooves 44b are recesses formed on a flat surface 44c. The flat surface 44c faces the flat surface 36c of the first separator 14 with the membrane electrode assembly 16 therebetween.

As illustrated in FIG. 1, a coolant channel 52 is formed between a surface 14b of the first separator 14 and a surface 18b of the second separator 18. The coolant channel 52 is connected to the coolant inlet manifold 34a and to the coolant outlet manifold 34b.

A first sealing member 54 is individually or integrally provided on the surfaces 14a and 14b of the first separator 14 so as to surround the outer edge of the first separator 14. A second sealing member 56 is individually or integrally provided on the surfaces 18a and 18b of the second separator 18 so as to surround the outer edge of the second separator 18.

Hereinafter, the operation of the fuel cell 10 will be described.

As illustrated in FIG. 1, an oxidant gas, such as air or another oxygen-containing gas, is supplied to the oxidant gas inlet manifold 30a. A fuel gas, such as a hydrogen-containing gas, is supplied to the fuel gas inlet manifold 32a. A coolant, such as pure water, ethylene glycol, or oil, is supplied to the coolant inlet manifold 34a.

The oxidant gas is introduced through the oxidant gas inlet manifold 30a to the oxidant gas channel 36 of the first separator 14. The oxidant gas flows through the oxidant gas channel 36 in the direction of arrow C (the direction of gravity), and is supplied to the cathode electrode 24 of the membrane electrode assembly 16 (see FIGS. 1 and 3).

The fuel gas is introduced through the fuel gas inlet manifold 32a to the fuel gas channel 44 of the second separator 18. The fuel gas flows through the fuel gas channel 44 in the direction of gravity (direction of arrow C), and is supplied to the anode electrode 26 of the membrane electrode assembly 16 (see FIGS. 1 and 4).

The oxidant gas and the fuel gas, which are respectively supplied to the cathode electrode 24 and the anode electrode 26, react with each other in the electrode catalyst layers of the membrane electrode assembly 16, thereby generating electric power.

Next, the oxidant gas, which has been supplied to the cathode electrode 24 of the membrane electrode assembly 16 and has been consumed, is discharged along the oxidant gas outlet manifold 30b in the direction of arrow A. The fuel gas, which has been supplied to the anode electrode 26 of the membrane electrode assembly 16 and has been consumed, is discharged to the fuel gas outlet manifold 32b.

The coolant, which has been supplied to the coolant inlet manifold 34a, is introduced to the coolant channel 52 between the first separator 14 of one of the power generation units 12 and the second separator 18 of another of the power generation units 12. Thus, the coolant, which is supplied through the coolant inlet manifold 34a to the coolant channel 52, flows in the direction of arrow B, cools the power generation units 12, and is discharged to the coolant outlet manifold 34b.

As illustrated in FIGS. 2 and 3, in the first embodiment, the channel width h1 of the first channel grooves 36a, which are in the central portion of the oxidant gas channel 36 in the channel width direction, is larger than the channel width h2 of the second channel grooves 36b, which are in both end portions of the oxidant gas channel 36 in the channel width direction.

Therefore, the flow rate of the oxidant gas in the central portion of the oxidant gas channel 36, which has the larger channel width h1, is higher than the flow rate of the oxidant gas in both end portions of the oxidant gas channel 36, which have the smaller channel width h2. Consequently, the difference in the flow rate of the oxidant gas is small across the entire area of the oxidant gas channel 36 (see FIG. 5). Thus, the stability of power generation under low load is improved, and, in particular, a decrease in performance that may occur when the concentration overpotential becomes excessively high under a high load is suppressed.

Figure 5:
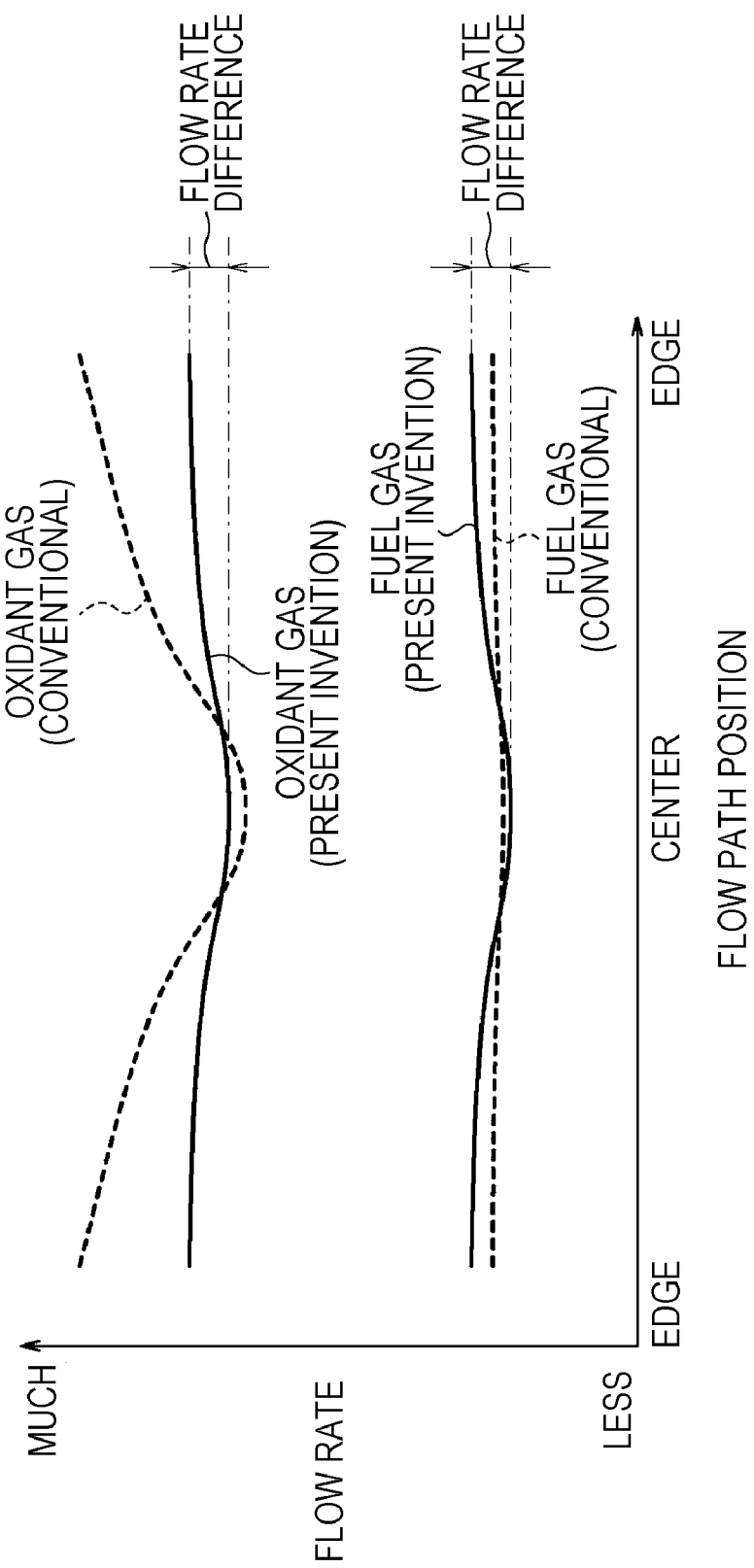
FIG. 5 is a graph illustrating the distribution of the flow rate in an oxidant gas channel and a fuel gas channel.

The flow rate of the fuel gas in the fuel gas channel 44 is comparatively low. As illustrated in FIGS. 2 and 4, the channel width h3 of the first channel grooves 44a, which are in the central portion of the fuel gas channel 44 in the channel width direction, is smaller than the channel width h4 of the second channel grooves 44b, which are in both end portions of the fuel gas channel 44 in the channel width direction. Therefore, as illustrated in FIG. 5, the difference in the flow rate is minimized across the entire area of the fuel gas channel 44, and the distribution of the flow rate of the fuel gas in the fuel gas channel 44 is similar to the distribution of the flow rate of the oxidant gas in the oxidant gas channel 36. Thus, the membrane electrode assembly 16 has a good power generation performance across the entire power generation surface thereof, thereby improving the power generation performance.

As illustrated in FIG. 3, in the first embodiment, the first channel grooves 36a of the oxidant gas channel 36 are disposed in the region a3 between the region a1 and the region a2. The region a1 corresponds to the width of the oxidant gas inlet portion 42a, and the region a2 corresponds to the width of the oxidant gas outlet portion 42b. Thus, the first channel grooves 36a are disposed in the central portion, through which it is difficult for the oxidant gas to flow. Therefore, the oxidant gas is substantially uniformly distributed to the entire area of the oxidant gas channel 36.

Figure 6:
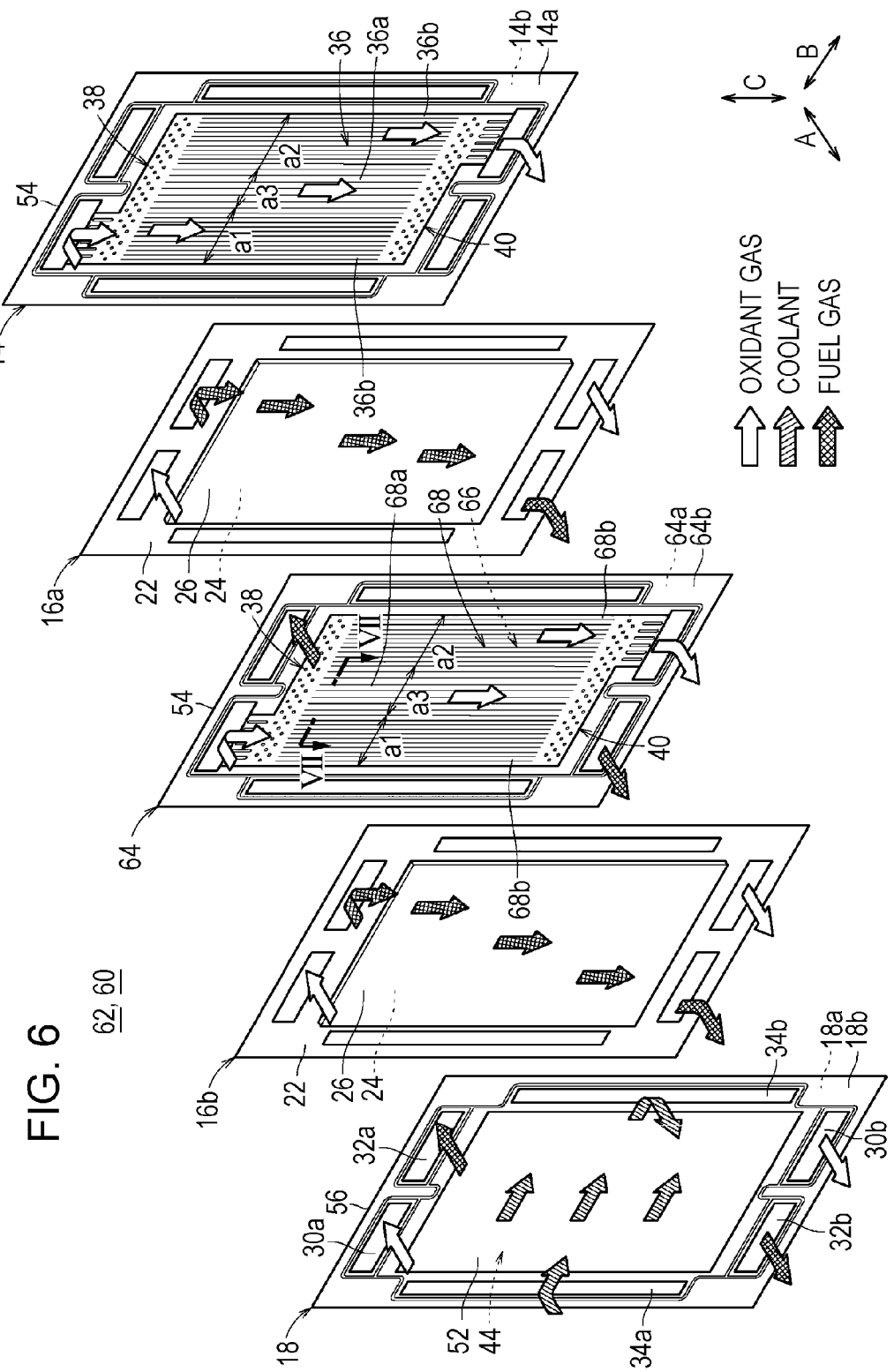
FIG. 6 is an exploded perspective view of a power generation unit of a fuel cell according to a second embodiment of the present invention.

FIG. 6 is an exploded perspective view of a power generation unit 62 of a fuel cell 60 according to a second embodiment of the present invention.

The elements the same as those of the fuel cell 10 according to the first embodiment will be denoted by the same numeral, and the description of such elements will be omitted. This also applies to the third embodiment described below.

Figure 7:
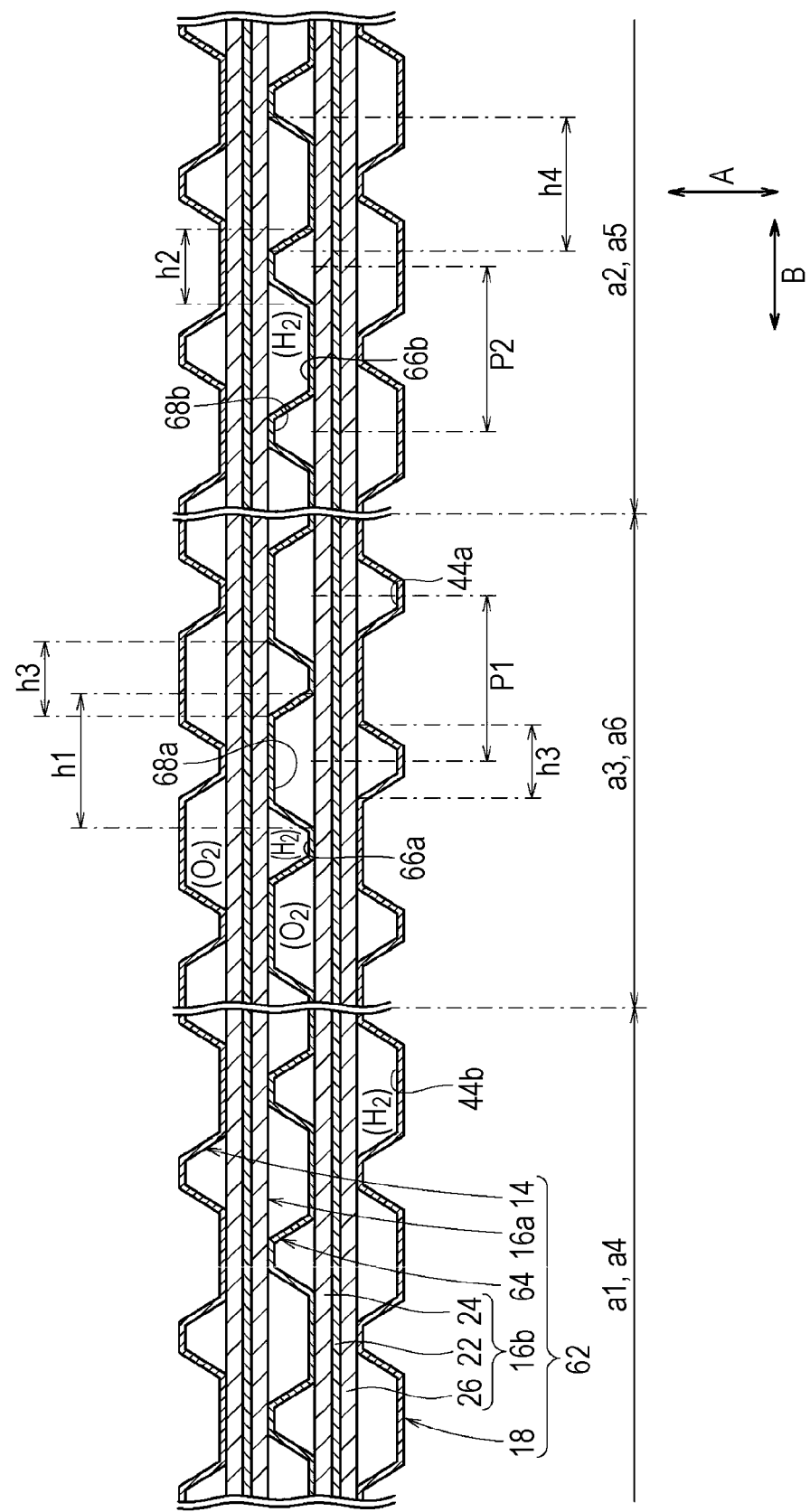
FIG. 7 is a sectional view of the fuel cell taken along line VII-VII of FIG. 6.

The power generation unit 62 includes the first separator 14, a first membrane electrode assembly (MEA) 16a, an intermediate separator 64, a second membrane electrode assembly 16b, and the second separator 18 (see FIGS. 6 and 7). The power generation unit 62 has a so-called skipped cooling structure.

Figure 8:
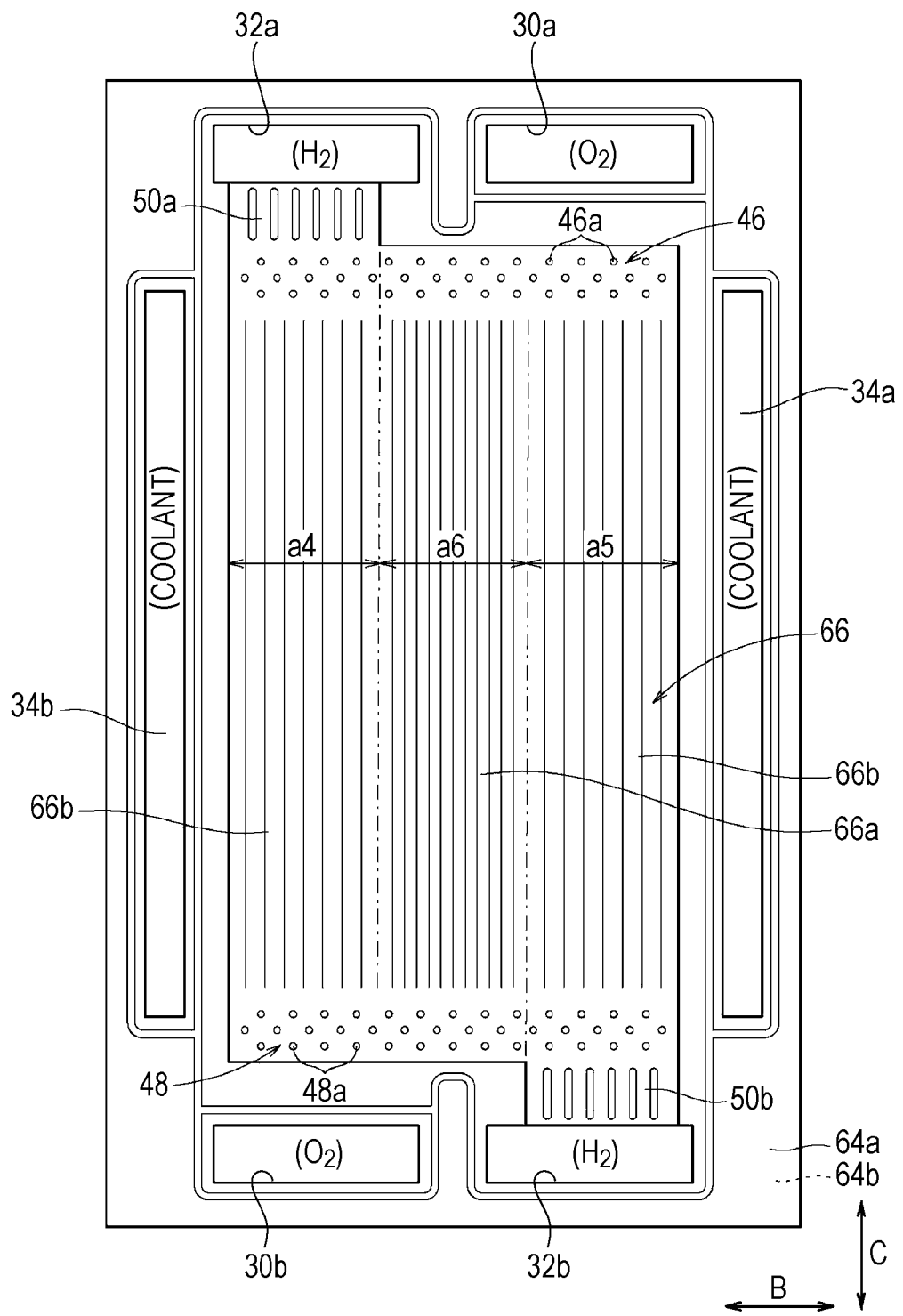
FIG. 8 is a plan view of an intermediate separator of the power generation unit.

As illustrated in FIG. 8, a fuel gas channel 66 is formed on a surface 64a of the intermediate separator 64 that faces the first membrane electrode assembly 16a. The fuel gas channel 66 connects the fuel gas inlet manifold 32a to the fuel gas outlet manifold 32b. As with the fuel gas channel 44, the fuel gas channel 66 has first channel grooves 66a and second channel grooves 66b. The first channel grooves 66a linearly extend in a region a6. The second channel grooves 66b linearly extend in each of regions a4 and a5. It is preferable that the number of the second channel grooves 66b on either end portion in the channel width direction be the same.

As illustrated in FIG. 6, an oxidant gas channel 68 is formed on a surface 64b of the intermediate separator 64 that faces the second membrane electrode assembly 16b. The oxidant gas channel 68 connects the oxidant gas inlet manifold 30a to the oxidant gas outlet manifold 30b. As with the oxidant gas channel 36, the oxidant gas channel 68 has first channel grooves 68a and second channel grooves 68b. The first channel grooves 68a linearly extend in a region a3. The second channel grooves 68b linearly extend in each of regions a1 and a2. It is preferable that the number of the second channel grooves 68b on either end portion in the channel width direction be the same.

As illustrated in FIG. 7, in the intermediate separator 64, the channel width h1 of the first channel grooves 68a of the oxidant gas channel 68 is larger than the channel width h2 of the second channel grooves 68b of the oxidant gas channel 68. The channel width h3 of the first channel grooves 66a of the fuel gas channel 66 is smaller than the channel width h4 of the second channel grooves 66b of the fuel gas channel 66.

Therefore, with the second embodiment, the oxidant gas is substantially uniformly distributed across the surface of the electrode. Moreover, the distributions of the flow rates of the oxidant gas and the fuel gas across the surfaces of the electrodes are similar, and thereby the power generation performance is improved and the effect the same as that of the first embodiment is produced.

Figure 9:
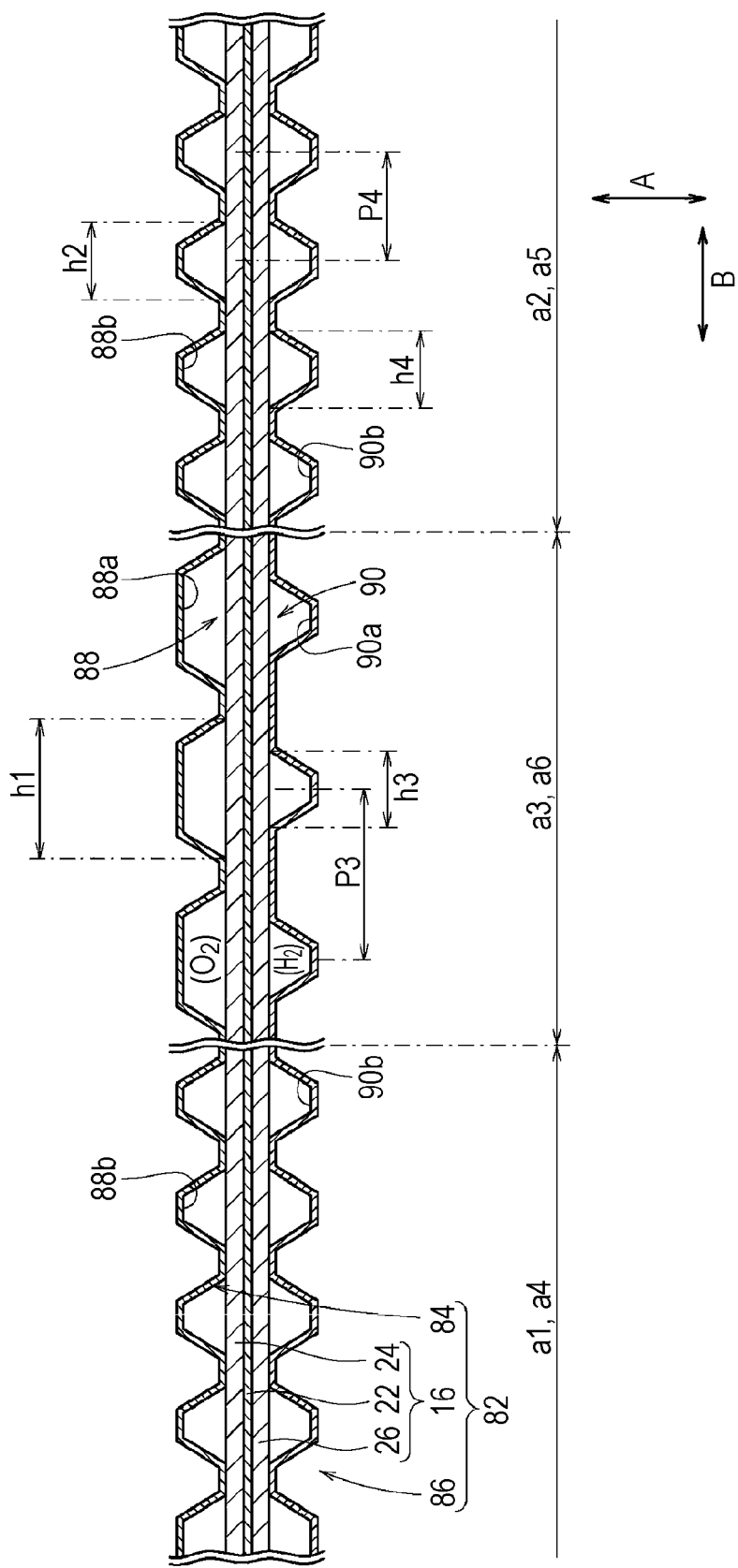
FIG. 9 is a partial sectional view of a power generation unit of a fuel cell according to a third embodiment of the present invention.
Figure 10:
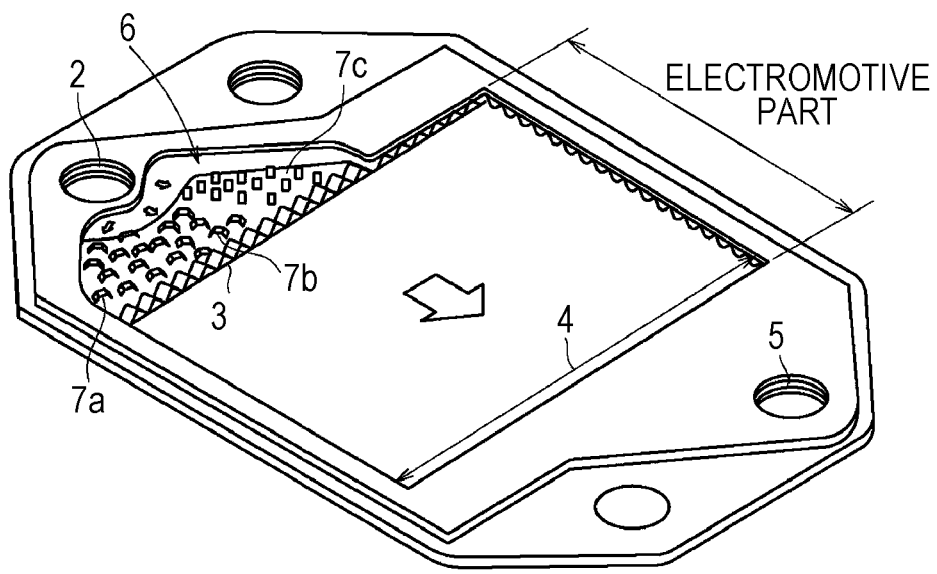
FIG. 10 is a perspective view of a separator of an existing fuel cell.

FIG. 9 is a partial sectional view of a power generation unit 82 of a fuel cell 80 according to a third embodiment of the present invention.

The power generation unit 82 includes a first separator (cathode separator) 84, the membrane electrode assembly 16, and a second separator (anode separator) 86. The power generation unit 82 may have a skipped cooling structure, as with the power generation unit 62 according to the second embodiment.

An oxidant gas channel 88 is disposed on a surface of the first separator 84 that faces the membrane electrode assembly 16. The oxidant gas channel 88 has first channel grooves 88a and second channel grooves 88b. The first channel grooves 88a linearly extend in a region a3. The second channel grooves 88b linearly extend in each of regions a1 and a2, which are located in end portions. The channel width h1 of the first channel grooves 88a is larger than the channel width h2 of the second channel grooves 88b.

A fuel gas channel 90 is disposed on a surface of the second separator 86 that faces the membrane electrode assembly 16. The fuel gas channel 90 has first channel grooves 90a and second channel grooves 90b. The first channel grooves 90a linearly extend in a region a6. The second channel grooves 90b linearly extend in each of regions a4 and a5, which are located in end portions.

The channel width h3 of the first channel grooves 90a is the same as the channel width h4 of the second channel grooves 90b. The channel pitch P3 of the first channel grooves 90a is larger than the channel pitch P4 of the second channel grooves 90b. The first channel grooves 88a and 90a face each other with the membrane electrode assembly 16 therebetween. The second channel grooves 88b and 90b face each other with the membrane electrode assembly 16 therebetween.

In the third embodiment, the channel width h1 of the first channel grooves 88a in the central portion of the oxidant gas channel 88 is larger than the channel width h2 of the second channel grooves 88b in both end portions of the oxidant gas channel 88. The channel width h3 of the first channel grooves 90a in the central portion of the fuel gas channel 90 is the same as the channel width h4 of the second channel grooves 90b in both ends portions of the fuel gas channel 90 (h3=h4). The channel pitch P3 of the first channel grooves 90a is larger than the channel pitch P4 of the second channel grooves 90b.

Thus, the oxidant gas is substantially uniformly distributed across the surface of the electrode, and the distributions of the flow rates of the oxidant gas and the fuel gas are similar (see FIG. 5). Therefore, the effect the same as those of the first and second embodiments is produced with a simple structure.

According to the embodiment of the invention, it is preferable that the fuel cell further include an oxidant gas inlet portion that connects the oxidant gas channel to the oxidant gas inlet manifold, and an oxidant gas outlet portion that connects the oxidant gas channel to the oxidant gas outlet manifold, and the central portion of the oxidant gas channel in the channel width direction be a region between a region that corresponds to a width of the oxidant gas inlet portion when viewed in a flow direction of the oxidant gas channel and a region that corresponds to a width of the oxidant gas outlet portion when viewed in the flow direction of the oxidant gas channel.

It is preferable that, in the fuel cell, the oxidant gas channel be formed on one surface of at least one of the separators, and the fuel gas channel be formed on another surface of the at least one of the separators.

According to the embodiment of the present invention, the channel width of the oxidant gas channel in the central portion of the oxidant gas channel in the channel width direction is larger than the channel width of the oxidant gas channel in both end portions of the oxidant gas channel in the channel width direction, and the channel width of the fuel gas channel in the central portion of the fuel gas channel in the channel width direction is smaller than the channel width of the fuel gas channel in both end portions in the channel width direction. Therefore, the oxidant gas is substantially uniformly distributed across the surface of the electrode with a simple structure. Moreover, the distributions of the flow rates of the oxidant gas and the fuel gas are similar, so that the power generation performance is improved.

According to the embodiment of the present invention, the channel width of the oxidant gas channel in the central portion of the oxidant gas channel in the channel width direction is larger than the channel width of the oxidant gas channel in both end portions of the oxidant gas channel in the channel width direction, and the channel pitch of the fuel gas channel in the central portion of the fuel gas channel in the channel width direction is larger than the channel pitch of the fuel gas channel in both end portions in the channel width direction. Therefore, the oxidant gas is substantially uniformly distributed across the surface of the electrode with a simple structure. Moreover, the distributions of the flow rates of the oxidant gas and the fuel gas are similar, so that the power generation performance is improved.

Obviously, numerous modifications and variations of the present invention are possible in light of the above teachings.

It is therefore to be understood that within the scope of the appended claims, the invention may be practiced otherwise than as specifically described herein.

What is claimed is:

1. A fuel cell comprising:
a membrane electrode assembly and separators which are stacked, the membrane electrode assembly comprising:
an electrolyte membrane; and
a pair of electrodes sandwiching the electrolyte membrane therebetween;
a fuel gas channel and an oxidant gas channel extending in a longitudinal direction of the separators, the fuel gas channel allowing a fuel gas to linearly flow along a surface of one of the pair of electrodes and the oxidant gas channel allowing an oxidant gas to linearly flow along a surface of another of the pair of electrodes;
a fuel gas inlet manifold and a fuel gas outlet manifold extending in a stacking direction through respective ends of the separators in a longitudinal direction of the separators at diagonally opposite positions of the fuel gas channel; and
an oxidant gas inlet manifold and an oxidant gas outlet manifold extending in the stacking direction through respective ends of the separators in the longitudinal direction of the separators at diagonally opposite positions of the oxidant gas channel,
wherein a channel width of the oxidant gas channel in a central portion of the oxidant gas channel in a channel width direction is larger than a channel width of the oxidant gas channel in both end portions of the oxidant gas channel in the channel width direction, and
wherein a channel width of the fuel gas channel in a central portion of the fuel gas channel in a channel width direction is smaller than a channel width of the fuel gas channel in both end portions of the fuel gas channel in the channel width direction.

2. A fuel cell comprising:
a membrane electrode assembly and separators which are stacked, the membrane electrode assembly comprising:
an electrolyte membrane; and
a pair of electrodes sandwiching the electrolyte membrane therebetween;
a fuel gas channel and an oxidant gas channel extending in a longitudinal direction of the separators, the fuel gas channel allowing a fuel gas to linearly flow along a surface of one of the pair of electrodes and the oxidant gas channel allowing an oxidant gas to linearly flow along a surface of another of the pair of electrodes;
a fuel gas inlet manifold and a fuel gas outlet manifold extending in a stacking direction through respective ends of the separators in a longitudinal direction of the separators at diagonally opposite positions of the fuel gas channel; and
an oxidant gas inlet manifold and an oxidant gas outlet manifold extending in the stacking direction through respective ends of the separators in the longitudinal direction of the separators at diagonally opposite positions of the oxidant gas channel,
wherein a channel width of the oxidant gas channel in a central portion of the oxidant gas channel in a channel width direction is larger than a channel width of the oxidant gas channel in both end portions of the oxidant gas channel in the channel width direction, and
wherein a channel pitch of the fuel gas channel in a central portion of the fuel gas channel in a channel width direction is larger than a channel pitch of the fuel gas channel in both end portions of the fuel gas channel in the channel width direction.

3. The fuel cell according to claim 1, further comprising:
an oxidant gas inlet portion that connects the oxidant gas channel to the oxidant gas inlet manifold; and
an oxidant gas outlet portion that connects the oxidant gas channel to the oxidant gas outlet manifold,
wherein the central portion of the oxidant gas channel in the channel width direction is a region between a region that corresponds to a width of the oxidant gas inlet portion when viewed in a flow direction of the oxidant gas channel and a region that corresponds to a width of the oxidant gas outlet portion when viewed in the flow direction of the oxidant gas channel.

4. The fuel cell according to claim 1,
wherein the oxidant gas channel is formed on one surface of at least one of the separators, and
wherein the fuel gas channel is formed on another surface of the at least one of the separators.

5. The fuel cell according to claim 2, further comprising:
an oxidant gas inlet portion that connects the oxidant gas channel to the oxidant gas inlet manifold; and
an oxidant gas outlet portion that connects the oxidant gas channel to the oxidant gas outlet manifold,
wherein the central portion of the oxidant gas channel in the channel width direction is a region between a region that corresponds to a width of the oxidant gas inlet portion when viewed in a flow direction of the oxidant gas channel and a region that corresponds to a width of the oxidant gas outlet portion when viewed in the flow direction of the oxidant gas channel.

6. The fuel cell according to claim 2,
wherein the oxidant gas channel is formed on one surface of at least one of the separators, and
wherein the fuel gas channel is formed on another surface of the at least one of the separators.

7. The fuel cell according to claim 3,
wherein the oxidant gas channel is formed on one surface of at least one of the separators, and
wherein the fuel gas channel is formed on another surface of the at least one of the separators.

8. The fuel cell according to claim 5,
wherein the oxidant gas channel is formed on one surface of at least one of the separators, and
wherein the fuel gas channel is formed on another surface of the at least one of the separators.

* * * * *